United States Patent [19]

Kitahara

[11] Patent Number: 5,491,674
[45] Date of Patent: Feb. 13, 1996

[54] DISK-REPRODUCED SIGNAL EQUALIZER FOR USE IN CONSTANT WAVE LENGTH-CONSTANT ANGULAR VELOCITY SCHEME

[75] Inventor: Shinichi Kitahara, Tokyo, Japan

[73] Assignee: NEC Corporation, Japan

[21] Appl. No.: 320,872

[22] Filed: Oct. 11, 1994

[30] Foreign Application Priority Data

Oct. 12, 1993 [JP] Japan .................................. 5-253863

[51] Int. Cl.$^6$ .................................................. G11B 17/22
[52] U.S. Cl. ............................. 369/32; 369/48; 369/124
[58] Field of Search ................................ 369/32, 60, 124, 369/47, 48, 54, 275.3, 275.1; 360/65, 45, 27, 29, 30

[56] References Cited

U.S. PATENT DOCUMENTS

| 4,786,989 | 11/1988 | Okamura et al. ........................ 360/65 |
| 4,907,100 | 3/1990 | Nishiyama et al. ....................... 360/45 |
| 5,138,599 | 8/1992 | Fukushima et al. ................... 369/275.3 |
| 5,255,261 | 10/1993 | Iida et al. ............................... 369/275.3 |
| 5,278,814 | 1/1994 | Deguchi et al. ....................... 369/275.3 |

FOREIGN PATENT DOCUMENTS 59-203208 11/1984 Japan .
1-173478 7/1989 Japan .

*Primary Examiner*—Georgia Y. Epps
*Assistant Examiner*—Tan Dinh
*Attorney, Agent, or Firm*—Ostrolenk, Faber, Gerb & Soffen

[57] ABSTRACT

A disk-reproduced signal equalizer includes pairs of delay circuits, selection circuits, and a differential amplifier circuit. The delay circuits are arranged in correspondence with a plurality of divided track areas on a disk and respectively having delay characteristics set to provide optimal equalization characteristics, for each track area, with respect to a reproduced signal input from a disk recording/reproducing apparatus of a constant wave length-constant angular velocity scheme of performing a recording/reproducing operation at a substantially constant recording wave length by changing a clock frequency in accordance with a track position while keeping a rotational speed of the disk constant. Each delay circuit has a plurality of output taps. The selection circuits select one of the pairs of delay circuit on the basis of information supplied from the disk recording/reproducing apparatus and indicating a track position. The differential amplifier circuit receives outputs from the output taps of one pair of delay circuit selected from the plurality of pairs of delay circuit, and performs predetermined equalization processing.

5 Claims, 4 Drawing Sheets

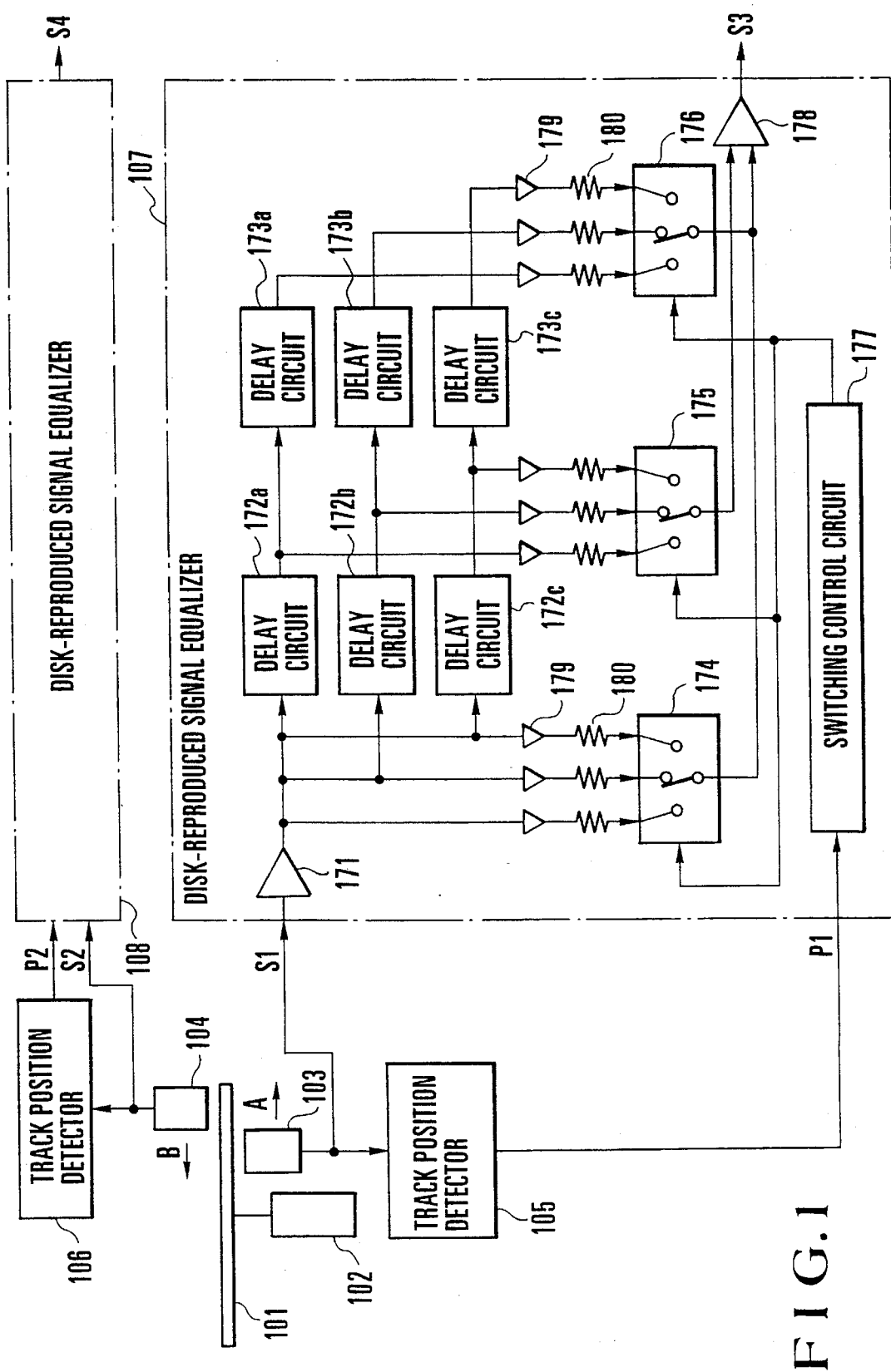
F I G. 1

DISK-REPRODUCED SIGNAL EQUALIZER FOR USE IN CONSTANT WAVE LENGTH-CONSTANT ANGULAR VELOCITY SCHEME

BACKGROUND OF THE INVENTION

The present invention relates to a disk-reproduced signal equalizer and, more particularly, to a disk-reproduced signal equalizer applied to a disk recording/reproducing apparatus of a CWL-CAV (Constant Wave Length-Constant Angular Velocity) scheme in which a recording/reproducing operation is performed at an almost constant recording wave length by changing the clock frequency in accordance with a track position while keeping the rotational speed of a disk constant.

In the recording/reproduction frequency characteristics of a disk recording/reproducing apparatus, the amplitude of a high-frequency component is generally smaller than that of a low-frequency component. For this reason, a reproduced signal equalizer is arranged on the output side of a reproduction head to emphasize the high-frequency component of a reproduced signal.

For example, data recording schemes for disk media include a CAV (Constant Angular Velocity) scheme of recording data at a constant bit rate while keeping the rotational speed of a disk constant, a CLV (Constant Linear Velocity) scheme of recording data at a constant bit rate while keeping the track linear velocity constant by changing the rotational speed of a disk in accordance with a track position, and a CWL-CAV (Constant Wave Length-Constant Angular Velocity) scheme of recording data at an almost constant wave length by changing the recording clock frequency in accordance with a track position while keeping the rotational speed of a disk constant.

In disk recording/reproducing apparatuses of the CAV and CLV schemes, since the bit rate of a reproduced signal is almost constant, and the maximum frequency of the reproduced signal hardly changes, a reproduced signal equalizer having fixed equalization characteristics is used.

FIG. 3 shows a conventional disk-reproduced signal equalizer applied to a CAV scheme disk recording/reproducing apparatus. An optical head 13 of the disk recording/reproducing apparatus reads an analog reproduced signal S11 of a constant bit rate from an optical disk 11 which is rotated at a constant angular velocity by a disk motor 12. In a disk-reproduced signal equalizer 14, the analog reproduced signal S11 is amplified by a buffer amplifier 141 and is delayed by delay circuits 142 and 143, each having a delay time τ. The analog reproduced signal S11 is then input to a differential amplifier circuit 144 via buffer amplifiers 145 to 147 and tap gain setting resistors 148 to 150 so as to be output as an equalized reproduced signal S12 which has undergone predetermined equalization processing. Letting fp be the emphasized peak frequency of the analog reproduced signal S11, $fp=1/2\tau$.

FIG. 4 shows another conventional disk-reproduced signal equalizer. In a disk-reproduced signal equalizer 15, an analog reproduced signal S11 from an optical head 13 is amplified by a buffer amplifier 91 and is digitized by an A-D converter 92. In this case, A-D conversion is executed by using a clock signal S13 having a constant period, which is supplied from a clock generator 98. The digitized reproduced signal is subjected to predetermined equalization processing in a known transversal filter 97. More specifically, delay circuits 94a to 94d operate in accordance with the clock signal S13 to delay the digitized reproduced signal by a predetermined time and output the respective tap outputs to coefficient multipliers 95a to 95e. An adder 96 adds the tap outputs respectively multiplied by coefficients by the coefficient multipliers 95a to 95e, and outputs an equalized reproduced signal S22.

In a CWL-CAV scheme disk recording/reproducing apparatus, the bit rate increases as a head moves toward the outer peripheral side of a disk, so that the maximum frequency which allows a recording/reproducing operation increases. For this reason, if the ratio of the peripheral velocity on the outer peripheral track of a disk to that on the inner peripheral track is large, proper equalization processing is difficult to perform. That is, even if the equalization characteristics are optimized on the basis of the maximum frequency of a reproduced signal on the inner peripheral track, since the maximum frequency of the reproduced signal on the outer peripheral track increases, predetermined equalization processing cannot be performed.

SUMMARY OF THE INVENTION

It is an object of the present invention to provide a disk-reproduced signal equalizer which is applied to a CWL-CAV scheme disk recording/reproducing apparatus and designed to perform optimal equalization processing for a reproduced signal whose maximum frequency changes in accordance with a track position.

In order to achieve the above object, according to the present invention, there is provided a disk-reproduced signal equalizer comprising a plurality of pairs of delay means arranged in correspondence with a plurality of divided track areas on a disk and respectively having delay characteristics set to provide optimal equalization characteristics, for each track area, with respect to a reproduced signal input from a disk recording/reproducing apparatus of a constant wave length-constant angular velocity scheme of performing a recording/reproducing operation at a substantially constant recording wave length by changing a clock frequency in accordance with a track position while keeping a rotational speed of the disk constant, each of the delay means having a plurality of output taps, selection means for selecting one pair of the plurality of pairs of delay means on the basis of information supplied from the disk recording/reproducing apparatus and indicating a track position, and differential amplifier means for receiving outputs from a plurality of output taps of the one pair of delay means selected from the plurality of pairs of delay means, and performing predetermined equalization processing.

BRIEF DESCRIPTION OF THE DRAWINGS

FIG. 1 is a block diagram showing a disk-reproduced signal equalizer according to an embodiment of the present invention;

DESCRIPTION OF THE PREFERRED EMBODIMENTS

Figure 2:
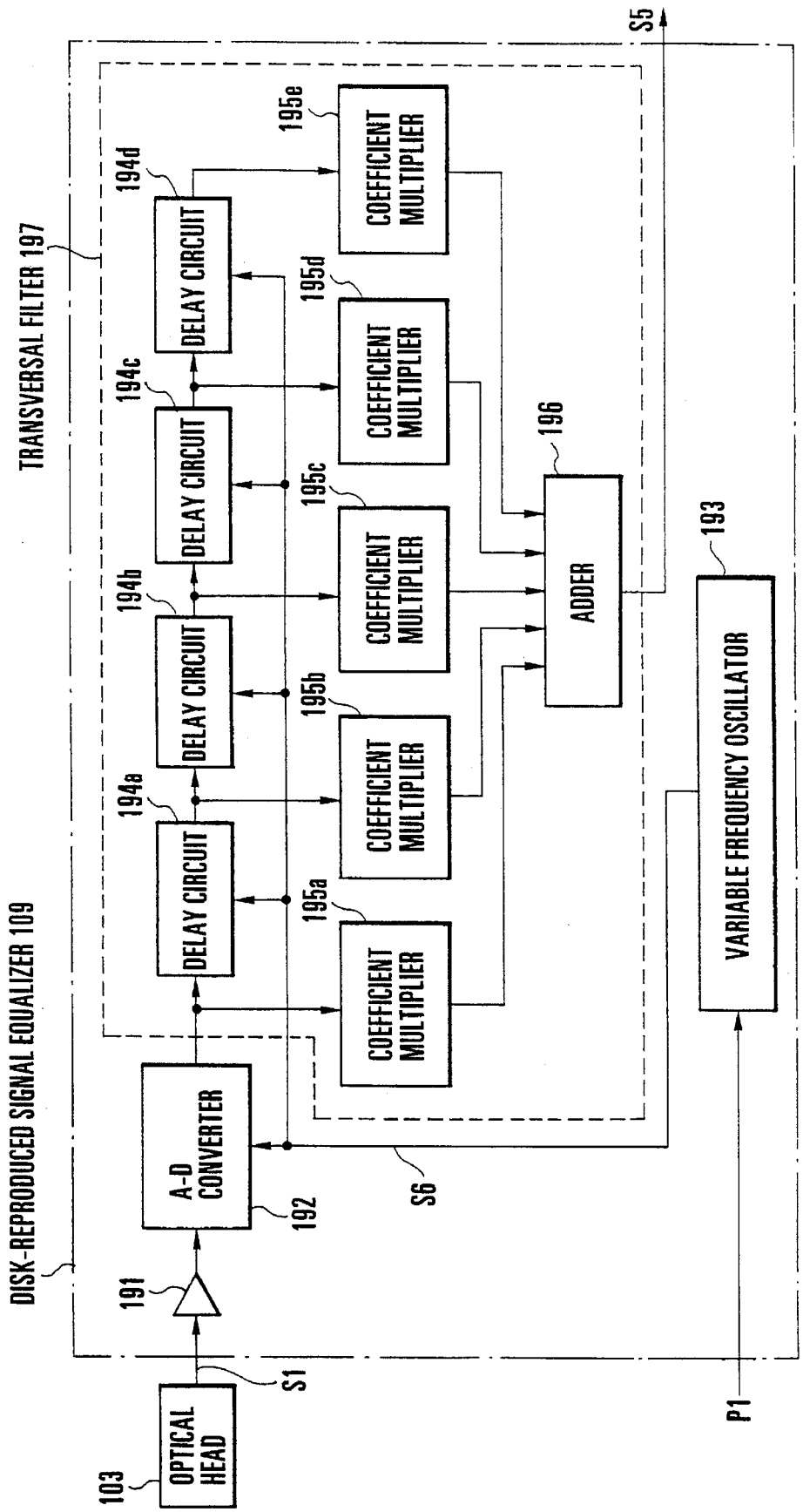
FIG. 2 is a block diagram showing a disk-reproduced signal equalizer according to another embodiment of the present invention.
Figure 3:
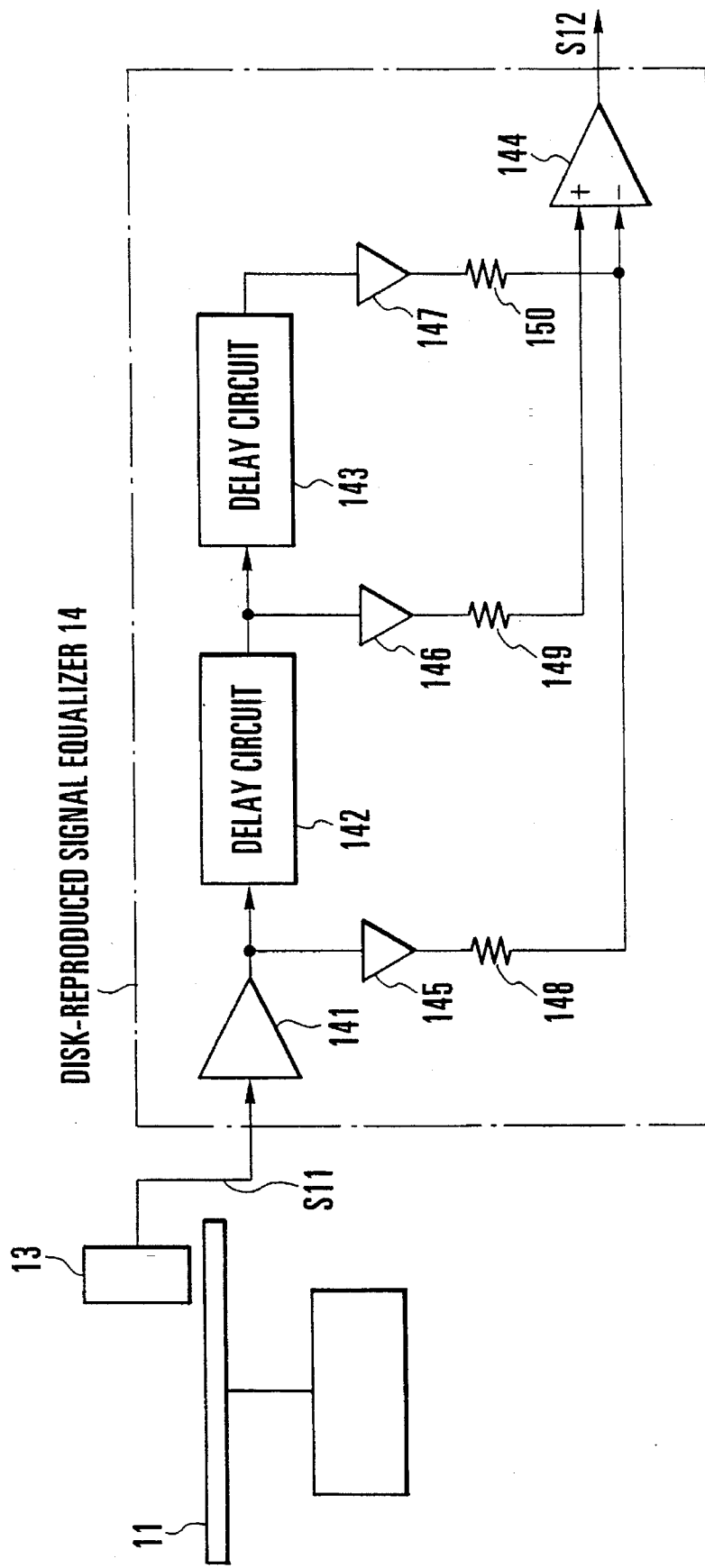
FIG. 3 is a block diagram showing a conventional disk-reproduced signal equalizer.

The present invention will be described below with reference to the accompanying drawings.

FIG. 1 shows a disk-reproduced signal equalizer according to an embodiment of the present invention. The disk-reproduced signal equalizer of the present invention is applied to the following CWL-CAV scheme disk recording/reproducing apparatus. The apparatus uses an optical disk 101 rotated at a constant angular velocity by a disk motor 2 and having upper and lower surfaces on which data can be recorded. An optical head 103 arranged at one surface of the optical disk 101 moves from the inner periphery to the outer periphery of the optical disk 101, as indicated by an arrow A. An optical head 104 arranged at the other surface of the optical disk 101 moves from the outer periphery to the inner periphery of the optical disk 101, as indicated by an arrow B. With this arrangement, the sum total of the bit rates of recording data supplied to the optical heads 103 and 104 is always kept constant. The optical heads 103 and 104 respectively output analog reproduced signals S1 and S2. Track position detectors 105 and 106 respectively output pieces of track position information P1 and P2.

For example, the track position detectors 105 and 106 may be designed to generate the pieces of track position information P1 and P2 by mechanically and directly reading the positions of the optical head 103 and 104, or to generate the pieces of track position information P1 and P2 by reading track addresses recorded in advance on the optical disk 101 for each track. The pieces of track position information P1 and P2 are pieces of information indicating the distance from the center of the optical disk 101 to a target track and are used to perform optical head position control and generate a recording/reproduction clock in a recording/reproducing operation.

Disk-reproduced signal equalizers 107 and 108 receive the analog reproduced signals S1 and S2 from the optical head 103 and 104 and perform equalization processing to output the resultant signals as equalized reproduced signals S3 and S4, respectively. In this case, each track of the optical disk 101 is divided into three areas, and equalization processing is performed with respect to each reproduced signal for each track area. Note that since the disk-reproduced signal equalizers 107 and 108 have the same arrangement, the internal blocks of only the disk-reproduced signal equalizer 107 are shown in FIG. 1 and will be described below.

The disk-reproduced signal equalizer 107 includes three pairs of series-connected delay circuits (172a and 173a), (172b and 173b), and (172c and 173c) respectively having delay times τa, τb, and τc, selection circuits 174, 175, and 176 for selecting one of the three pairs of series-connected delay circuits, a switching control circuit 177 for controlling the selection circuits 174, 175, and 176 in accordance with the track position information P1, and a differential amplifier circuit 178.

The analog reproduced signal S1 is amplified first by a buffer amplifier 171 and then passes through the three pairs of series-connected delay circuits (172a and 173a), (172b and 173b), and (172c and 173c). The selection circuits 174, 175, and 176 respectively tap outputs from the buffer amplifier 171 and the three pairs of series-connected delay circuits (172a and 173a), (172b and 173b), and (172c and 173c) via a buffer amplifier 179 and a tap gain setting resistor 180. Each of the selection circuits 174, 175, and 176 is then controlled by the switching control circuit 177 to select one of the received tap outputs. The differential amplifier circuit 178 receives the three outputs from the selection circuits 174, 175, and 176 and outputs the resultant signal as the equalized reproduced signal S3 which has undergone predetermined equalization processing.

In this case, the delay times τa, τb, and τc of the delay circuits constituting the three pairs of series-connected delay circuits are set to provide optimal equalization characteristics with respect to each of the three divided areas of each track of the optical disk 101. Note that if each track is divided into n areas (n is an integer of two or more), n pairs of delay circuits may be arranged for the respective track areas.

As described above, a plurality of pairs of series-connected delay circuits are arranged in accordance with the respective track areas on a disk, and one of the plurality of pairs of series-connected delay circuits is selected in accordance with a track position, thereby performing optimal equalization processing with respect to a reproduced signal whose maximum frequency changes in accordance with a track position. Note that equalization processing with higher precision can be realized by increasing the number of divided track areas.

FIG. 2 shows a disk-reproduced signal equalizer according to another embodiment of the present invention.

Figure 4:
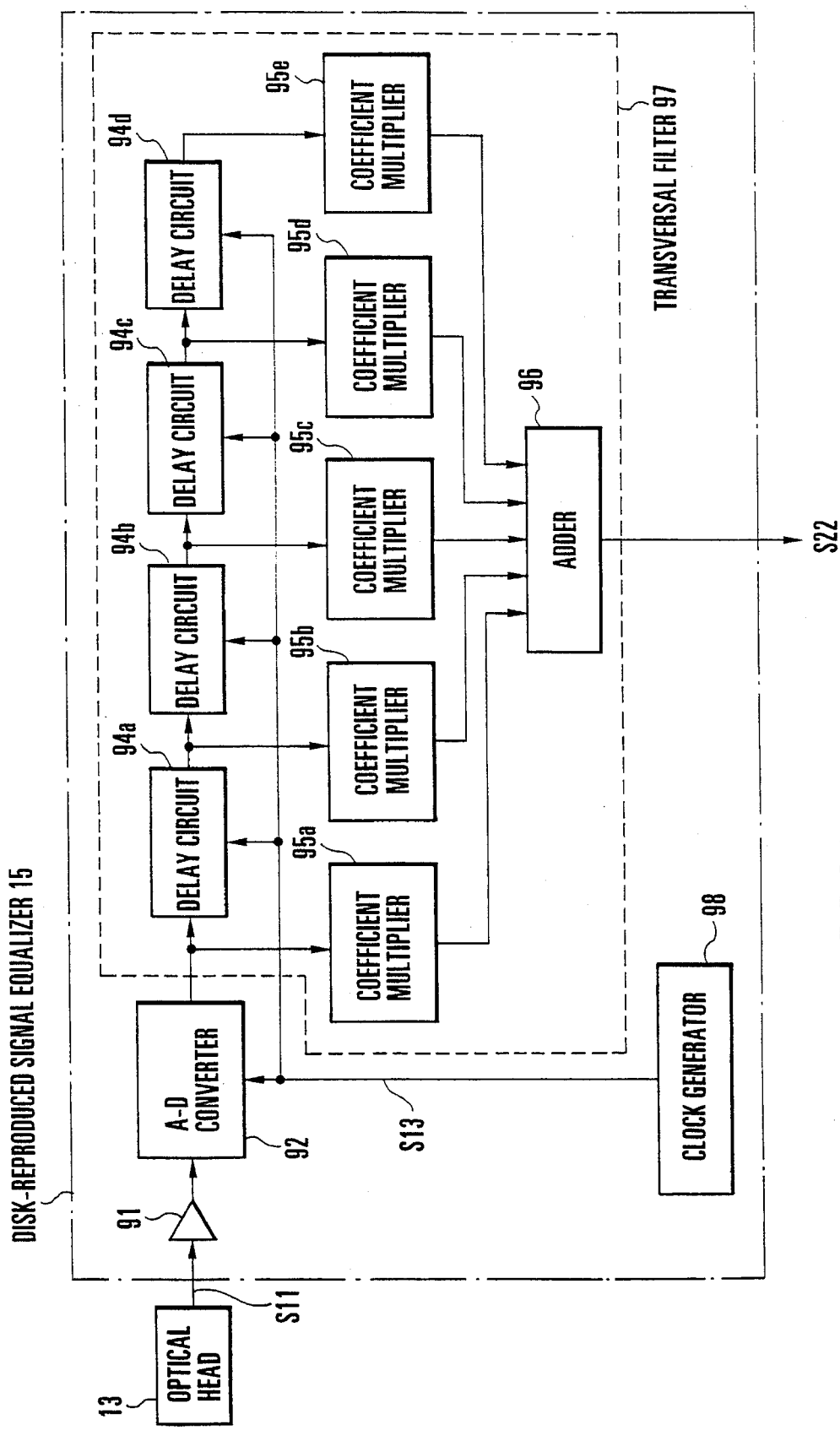
FIG. 4 is a block diagram showing another conventional disk-reproduced signal equalizer.

This embodiment uses a variable frequency oscillator 193 in place of the clock generator 98 of the conventional disk-reproduced signal equalizer 15 shown in FIG. 4. The variable frequency oscillator 193 generates a clock signal S6 by changing the frequency in accordance with track position information P1. The frequency of the clock signal S6 is set to be equal to that of a recording clock at a track indicated by the track position information P1.

More specifically, a disk-reproduced signal equalizer 109 of this embodiment is constituted by the variable frequency oscillator 193, a buffer amplifier 191, an A-D converter 192, and a transversal filter 197. The variable frequency oscillator 193 generates the clock signal S6 by changing the frequency in accordance with the track position information P1. The buffer amplifier 191 amplifies a reproduced signal S1 from the optical head 103. The A-D converter 192 receives the clock signal S6 from the variable frequency oscillator 193 and A-D-converts an output from the buffer amplifier 191. The transversal filter 197 receives the clock signal S6 from the variable frequency oscillator 193 and performs predetermined equalization processing with respect to an output from the A-D converter 192, thereby outputting an equalized reproduced signal S5. The transversal filter 197 is constituted by a plurality of delay circuits 194a to 194d, coefficient multipliers 195a to 195e, and an adder 196. The delay circuits 194a to 194d are series-connected and sequentially delay an output from the A-D converter 192. The coefficient multipliers 195a to 195e receive and weight tap outputs from the A-D converter 192 and the delay circuits 194a to 194d. The adder 196 adds outputs from the coefficient multipliers 195a to 195e.

The analog reproduced signal S1 from the optical head 103 is amplified by the buffer amplifier 191 and input to the A-D converter 192. The A-D converter 192 digitizes the analog reproduced signal from the buffer amplifier 191 in accordance with the clock signal S6 from the variable frequency oscillator 193, and supplies the digital signal to the delay circuits 194a to 194d constituting the transversal filter 197. The delay circuits 194a to 194d operate in accordance with the clock signal S6 to delay the digital reproduced signal by a predetermined time and output the respective tap outputs to the coefficient multipliers 195a to 195e. The adder 96 adds the tap outputs respectively multiplied by coefficients by the coefficient multipliers 195a to 195e, and outputs the resultant signal as the reproduced signal S5 which has undergone predetermined equalization processing.

With this operation, the delay amounts of the delay circuits 194a to 194d for determining the emphasized peak frequency of a reproduced signal change in accordance with a track position, so that the emphasized peak frequency changes in proportion to the track linear velocity. Therefore, optimal equalization processing can always be performed for a reproduced signal.

As has been described above, according to the present invention, in a disk-reproduced signal equalizer applied to a disk recording/reproducing apparatus of the CWL-CAV scheme of recording/reproducing data at an almost constant recording wave length by changing the clock frequency in accordance with a track position, a plurality of pairs of series-connected delay circuits for providing optimal equalization characteristics for a reproduced signal are arranged in correspondence with the respective track areas on a disk, and one of the plurality of pairs of series-connected delay circuit is selected in accordance with a track position. With this operation, optimal equalization processing can be performed for a reproduced signal whose maximum frequency changes in accordance with a track position, and an improvement in reproduction quality can be achieved.

In addition, the disk-reproduced signal equalizer may include a variable frequency oscillator for generating a clock signal whose frequency changes in accordance with track position information. In this arrangement, a reproduced signal is digitized in accordance with a clock signal, and a transversal filter is operated in accordance with this clock signal. With this operation, optimal equalization processing can be performed with respect to a reproduced signal whose maximum frequency changes in accordance with a track position, and an improvement in reproduction quality can be achieved.

What is claimed is:

1. A disk-reproduced signal equalizer for processing a disk-reproduced signal comprising:

a plurality of pairs of delay means arranged in correspondence with a plurality of divided track areas on a disk and respectively having delay characteristics for each track area, with respect to a reproduced signal input from a disk recording/reproducing apparatus of a constant wave length-constant angular velocity scheme of performing a recording/reproducing operation at a substantially constant recording wave length by changing a clock frequency in accordance with a track position while keeping a rotational speed of the disk constant, each of said delay means having a plurality of output taps;

selection means for selecting one pair of said plurality of pairs of delay means on the basis of information supplied from said disk recording/reproducing apparatus and indicating a track position; and differential amplifier means for receiving outputs from a plurality of output taps of said one pair of delay means selected from said plurality of pairs of delay means, and performing predetermined equalization processing, whereby the disk-reproduced signal is processed to obtain a desired, optimized equalization characteristic.

2. An equalizer according to claim 1, wherein a delay time is set in each of said plurality of pairs of delay means with respect to a maximum frequency in each track area.

3. An equalizer according to claim 1, wherein when said disk is divided into n track areas, n pairs of delay means are arranged in correspondence with the n tracks.

4. An equalizer according to claim 1, further comprising switching control means for controlling a selecting operation of said selection means on the basis of information supplied from said disk recording/reproducing apparatus and indicating a track position.

5. An equalizer according to claim 1, wherein said differential amplifier means outputs an equalized reproduced signal having said optimized equalization characteristic with respect to a maximum frequency in each track area.

* * * * *